United States Patent
Bridger et al.

[11] 3,871,744
[45] Mar. 18, 1975

[54] OPTICAL FIBER CONNECTOR

[75] Inventors: Andrew Bridger, Brighton; Mark L. Dakss, Waltham; Stanley Zemon, Boston; Samuel M. Stone, Lynnfield, all of Mass.

[73] Assignee: GTE Laboratories Incorporated, Waltham, Mass.

[22] Filed: Aug. 19, 1974

[21] Appl. No.: 498,805

[52] U.S. Cl. ............... 350/96 C, 339/101, 339/105, 350/96 WG
[51] Int. Cl. .......................... G02b 5/14, H01r 13/58
[58] Field of Search...350/96 C, 96 B, 96 R, 96 WG, 350/320; 339/101, 105

[56] References Cited
UNITED STATES PATENTS
3,792,284  2/1974  Kaelin .............................. 350/96 C Primary Examiner—John K. Corbin
Assistant Examiner—Jon W. Henry
Attorney, Agent, or Firm—Irving M. Kriegsman; Bernard L. Sweeney

[57] ABSTRACT

An optical fiber connector is described which has particular utility with those optical fibers having a protective sheath normally therearound. The main body of the connector has a pair of communicating bores therein commencing from the opposite end faces thereof. Each of these bores has an enlarged first portion, the far surface of which serves as a stop for a component of the completed optical fiber connector assembly. The optical fiber is held relatively rigidly at each end of the connector; however, it is left relatively unsupported in the center portion. A bow is formed in the optical fiber in the unsupported center portion such that any physical stresses which are placed on the optical fiber connector during normal handling thereof are transferred to the protective sheath rather than to the optical fiber thereby enhancing the reliability.

9 Claims, 2 Drawing Figures

OPTICAL FIBER CONNECTOR

The coupling of optical fibers involves generally precise mechanical control of the alignment of the optical fibers to achieve low coupling losses. Furthermore, for optical communications systems to be of general utility, the couplers associated therewith must be such as to be adaptable to use in the field. Therefore, the connectors must be rugged, yet simple in construction so as to provide physical protection for the actual optical fibers, yet allow for quick and convenient operation of the coupling function.

A concentric type of optical fiber connector and a coupler arrangement therefor are disclosed and claimed in a copending patent application entitled "Optical Fiber Connector and Coupler" by Dakss et al., which is being filed concurrently herewith and which is assigned to the same assignee as the instant application. In this connector configuration, the location of the end of the optical fiber is disposed in the center of an end face and is indexed carefully with respect to a chosen external surface on the optical fiber connector such that the optical fiber may be accurately mated for coupling purposes with another similarly mounted optical fiber.

Another fiber to fiber coupling technique which has been reported in the literature is the Krumpholz eccentric coupler described in the German publication AEU ARCHIV FUR ELECTRONIK UND UBERTRAGUNGSTECHNIK, Vol. 26, (1972), pp. 288 – 289. In this coupling technique, the mating ends of the two fibers to be connected are mounted eccentrically in metal plugs. The two plugs are rotatably inserted in holes in the coupler having parallel but slightly offset axes. When the plugs are rotated on their respective axes, the fiber ends trace out a pair of circles which intersect at two points so that the fiber ends can be made to coincide precisely.

SUMMARY OF THE INVENTION

It is, therefore, an object of the present invention to provide a novel optical fiber connector for use with sheathed optical fibers.

It is another object of the present invention to provide such an optical fiber connector which incorporates protection for the optical fiber against external forces which are normally exerted on the connector.

It is a further object of the invention to provide such an optical fiber connector which is of simple and durable construction and which is readily adaptable to a variety of optical fiber to fiber coupling techniques.

Accordingly, the invention in its broadest aspect is an optical fiber connector for use with optical fibers having a protective sheath normally therearound. A main body of the optical fiber connector has a generally cylindrical external configuration and has front and rear surfaces thereon. The optical fiber enters the main body through the rear surface and terminates adjacent to the front surface. The main body has a first, generally axial bore extending inwardly from the rear surface toward the front surface and is sized to receive the optical fiber freely therethrough. The first bore has an enlarged rear portion so as to receive freely the sheath and optical fiber over the full length thereof. The main body also has a second bore extending rearwardly from the front surface and generally parallel to the first bore. The second bore is also enlarged over the front portion thereof and it communicates at the rear with the first bore. An inner rigid circular cylindrical sleeve is disposed in the enlarged forward portion of the second bore and has an axial bore therethrough. This bore is sized to enable the optical fiber to be inserted therein. The outer diameter of the inner sleeve is defined as being within the range of diameters limited by the second bore and the enlarged portion thereof. Means are provided for affixing the optical fiber to the inner sleeve. Means are also provided for forming a bow in the optical fiber in the rear portion of the second bore so that the external forces on the optical fiber connector are exerted on the sheath rather than on the optical fiber. Finally, means are provided for affixing the inner sleeve to the main body and for affixing the sheath to the main body.

These and other objects, advantages and features of the invention will be apparent in the following detailed description of the preferred embodiments taken together with the accompanying drawing.

DETAILED DESCRIPTION OF THE PREFERRED EMBODIMENTS

Figure 1:
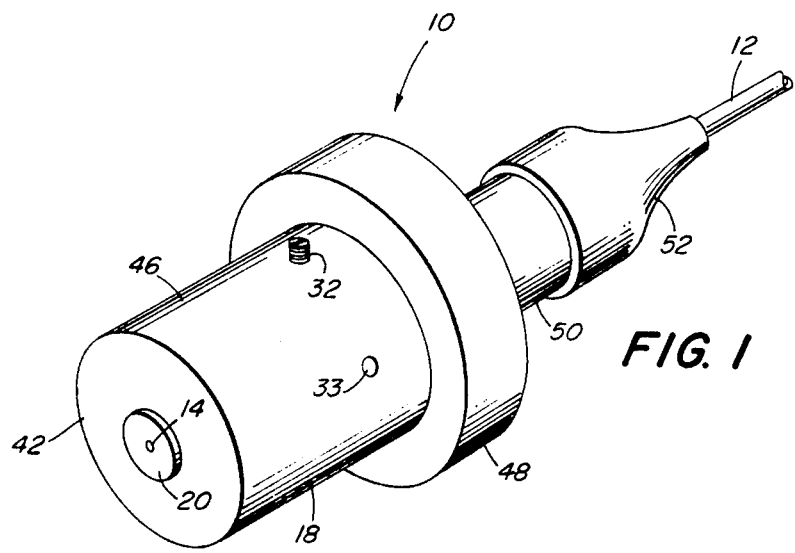
FIG. 1 is an isometric view of an optical fiber connector according to the present invention.

In referring to the several figures of the drawing, like reference numerals are used to refer to identical parts of the apparatus described.

Figure 2:
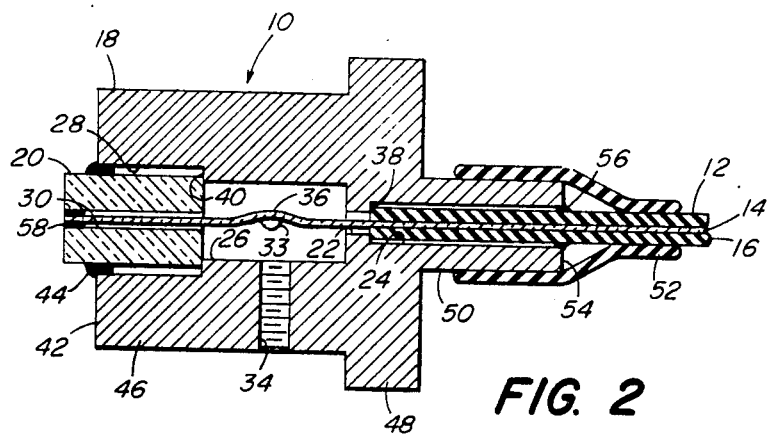
FIG. 2 is a sectional side-elevational view of the optical fiber connector shown in FIG. 1.

The optical fiber connector of the present invention as shown in FIGS. 1 and 2 of the drawing is identified generally by the reference numeral 10. A sheathed optical fiber 12, comprised of an optical fiber 14 in a protective sheath 16 is terminated within an optical fiber connector main body 18. The terminating end of the optical fiber 14 is disposed within and coterminated with a rigid protective inner sleeve 20 which protrudes slightly from the front face 42 of the optical fiber connector main body 18.

The sheathed optical fiber 12 enters the optical fiber connector main body 18 through the rear surface 54 thereof via a first bore 22 which extends inwardly from the rear surface 54 and which is generally concentric with the outer surface 50 of the main body 18 at the rear. The rear portion 24 of the bore 22 is enlarged sufficiently to accommodate the sheathed optical fiber 12, whereas the bore 22 per se is smaller in diameter and accommodates only the optical fiber 14 although a close fit is not required. A shoulder 38 is formed thereby at the end of the rear portion 24. Similarly, a second bore 26 extends rearwardly from the front face 42 of the optical fiber connector main body 18 and communicates with the first bore 22. Again, the initial portion 28 of the second bore 26 is enlarged and is sized so as to accommodate the outer diameter of the inner sleeve 20 therein and forms a second shoulder 40 at the end thereof. The diameter of the second bore 26 is too small to allow entrance of the inner sleeve 20 therein.

While the first bore 22 is formed generally axially in the optical fiber connector main body 18, the second bore 26 is formed with its axis parallel to that of the first bore 22 but need not be coaxial therewith. The determining factors are the type of connector which is being formed and the degree of positional control which is desired to be inherent in the coupler components. If the optical fiber connector is of the concentric type disclosed in the aforementioned Dakss et al. application, the coaxiality of the bore axis is preferable, whereas with an eccentric configuration, such as the Krumpholz eccentric coupler, coaxiality is usually not a requirement since the separation of the axes may be closely controlled and a closely controlled fit may be maintained between the inner sleeve and the enlarged portion 28 at the second bore. However, if a separate fiber positioning step is included in the assembly process, then the bore-sleeve fit may be very loose and yet form either type of coupler irrespective of the coaxiality of the bores.

The optical fiber connector main body 18 in the preferred embodiment of the present invention is of a generally cylindrical configuration and has surfaces of three different diameters 46, 48 and 50 proceeding from the front surface 42 rearwardly to the rear surface 54. The forward cylindrical surface 46 is utilized primarily as an indexing guide for seating the optical fiber connector 10 in a suitable coupling device so that good optical coupling may be had to another similarly mounted optical fiber. The second cylindrical surface 48 is of greater diameter and is mainly a handling surface for the optical fiber connector. The rear cylindrical surface 50 is smaller in diameter and functions together with a means 52 to reduce bending of the optical fiber 14 adjacent to the rear surface 54 of the optical fiber connector main body 18. The bending of the optical fiber during handling can also cause breakage. The means 52 may take the form of heat shrinkable or other restrictive tubing or may be a boot molded in situ about the sheathed optical fiber 12 and the rear cylindrical surface 50.

The termination end of the optical fiber 14 is held within a rigid cylindrical inner sleeve 20 by a suitable adhesive 58. The bore 30 of the inner sleeve 20 is of a diameter slightly larger than the optical fiber 14. In this manner, the axis of the optical fiber is maintained approximately parallel to the axis of the inner sleeve 20. The length of the inner sleeve is such that, when bearing against the shoulder 40 in the second bore 26, the end thereof at which the optical fiber is terminated protrudes slightly from the front surface 42 of the optical fiber connector main body 18. In turn, the inner sleeve 20 is affixed to the optical fiber connector main body 18 by a suitable adhesive 44.

In the portion of the optical fiber connector main body 18 in which the unenlarged portion of the second bore 26 is located, means are disposed for forming a bow 36 in the optical fiber 14. In the embodiment shown, the means comprises a tapped radial hole 34 in the optical fiber connector main body 18 into which a screw 32 may be inserted and removed after the bow 36 is formed and the optical fiber 14 is finally affixed to the inner sleeve 20.

The assembly of the optical fiber connector 10 proceeds generally in the following manner. A portion of the sheath 16 of the sheathed optical fiber 12 is stripped away either mechanically or chemically to leave a length of bare optical fiber 14. The prepared optical fiber 12 is inserted into the first bore 22 of the optical fiber connector main body 18 until the sheath 16 bears against the shoulder 38. The sheathed optical fiber 12 is then affixed to the rear surface 54 and in the bore 24 by an adhesive 56. The inner sleeve 20 is slipped over the bare portion of the optical fiber 14, slid into position against the shoulder 40 in the second bore 26, and there fixed by use of a suitable adhesive. The screw 32 is threaded into the hole 34 sufficiently to bear against the optical fiber 14 and cause a bow 36 to be formed therein. A hole 33 may be provided for viewing the optical fiber 14 to ascertain the degree of bending. The amount of bending of the optical fiber 14 in the bow 36 must be such as not to exceed the minimum bend radius for the particular optical fiber to avoid loss of light at the bow. The optical fiber 14 is now adhered to the inner sleeve 20 in any suitable manner. The screw is at least partially removed. If necessary, the inner sleeve 20 may be freed from the main body 18 and appropriately positioned in the enlarged portion 28 of the second bore 26 so that the desired positional relationship is achieved between the outer surface 46 of the optical fiber connector main body 18 and the end of the optical fiber 14. The inner sleeve 20 is then reaffixed to the optical fiber connector main body 18. One technique for accomplishing such a positioning is disclosed and claimed in a copending patent application entitled "Method and Apparatus for Forming an Optical Fiber Connector" by Dakss et al., which is being filed concurrently herewith and which is assigned to the same assignee as the instant application. The subject matter thereof is incorporated herein by reference. The means 52 is now emplaced over the rear cylindrical surface 50 and the sheathed optical fiber 12. Finally, the end of the optical fiber 14 and the inner sleeve may be polished to enhance the resultant coupling capabilities.

While there have been shown and described what are considered to be preferred embodiments of the present invention, certain changes and modifications will be apparent to persons skilled in the art. Such changes and modifications may be made therein without departing from the spirit of the invention as defined by the appended claims.

We claim:

1. A connector for an optical fiber having a protective sheath normally therearound comprising
 a main body having a generally cylindrical external configuration and front and rear surfaces, the optical fiber entering the main body through the rear surface and terminating adjacent to the front surface, the main body having a first, generally axial bore extending inwardly from the rear surface toward the front surface and being sized to receive the optical fiber freely therethrough, the first bore having a forward portion and an enlarged diameter rear portion, the enlarged portion being sized to receive freely the sheath and optical fiber over the full length thereof, the main body also having a second bore extending rearwardly from the front surface generally parallel to the first bore and having a rear portion and an enlarged diameter forward portion, and communicating at the rear thereof with the first bore,
 an inner rigid right circular cylindrical sleeve being disposed in the enlarged forward portion of the second bore and having an axial bore therethrough, the bore of the inner sleeve being sized to enable the optical fiber to be inserted therein, the outer diameter of the inner sleeve being within the range of diameters defined by the rear portion of the second bore and the enlarged portion thereof, means for affixing the optical fiber to the inner sleeve, means for forming a bow in the optical fiber in the rear portion of the second bore so that external forces are exerted on the sheath rather than the optical fiber, means for affixing the inner sleeve to the main body, and means for affixing the sheath to the main body.

2. A connector according to claim 1, wherein there is further included means for minimizing bending of the sheathed optical fiber adjacent to the main body.

3. A connector according to claim 2, wherein the second bore is formed slightly eccentrically in the main body so that the optical fiber termination adjacent to the front surface of the main body is eccentric as well.

4. A connector according to claim 2, wherein the first and second bores are formed coaxially in the main body and the main body has an external surface thereon to which the location of the optical fiber termination may be indexed.

5. A connector according to claim 4, wherein the external surface is a right circular cylindrical surface on the main body and the termination of the optical fiber is concentric therewith.

6. A connector according to claim 2, wherein the means for forming a bow in the optical fiber includes a member movably extending through the main body lateral to the axis for bearing against the optical fiber to force the optical fiber to form a bow prior to affixing the optical fiber to the inner sleeve.

7. A connector according to claim 2, wherein the inner sleeve and the optical fiber protrude from the main body and have a polished end surface thereon.

8. A connector according to claim 2, wherein the means for minimizing bending is a length of constrictive tubing emplaced over the interface between the sheathed optical fiber and the main body at the rear face thereof.

9. A connector according to claim 2, wherein the means for minimizing bending is a resilient plastic sleeve molded over the interface between the sheathed optical fiber and the main body at the rear face thereof.

* * * * *